United States Patent [19]
Bodor et al.

[11] Patent Number: 5,837,307
[45] Date of Patent: *Nov. 17, 1998

[54] PROCESS FOR MAKING SPREADS

[75] Inventors: Janos Bodor, Rijswijk, Netherlands; Matthew Patrick, Naperville, Ill.; Thomas Wajda, Jr., Columbia; Leendert Hendrik Wesdorp, Elliott City, both of Md.

[73] Assignee: Van den Bergh Foods Co., Division of Conopco, Inc., Lisle, Ill.

[ * ] Notice: The term of this patent shall not extend beyond the expiration date of Pat. No. 5,554,407.

[21] Appl. No.: 622,096

[22] Filed: Mar. 26, 1996

Related U.S. Application Data

[63] Continuation of Ser. No. 445,485, May 22, 1995, Pat. No. 5,554,407, which is a continuation of Ser. No. 335,568, Nov. 7, 1994, abandoned, which is a continuation of Ser. No. 84,752, Jun. 29, 1993, abandoned, which is a continuation of Ser. No. 822,503, Jan. 17, 1992, abandoned.

[51] Int. Cl.⁶ ............................................. A23D 7/04
[52] U.S. Cl. ................................. 426/603; 426/602
[58] Field of Search ..................................... 426/603, 602

[56] References Cited

U.S. PATENT DOCUMENTS

| | | |
|---|---|---|
| Re. 21,406 | 3/1940 | Vogt . |
| 2,878,126 | 3/1959 | Roberts . |
| 3,457,086 | 7/1969 | Josefowicz et al. . |
| 3,661,364 | 5/1972 | Lage . |
| 3,682,656 | 8/1972 | Wilton et al. . |
| 4,087,565 | 5/1978 | Ebskamp . |
| 4,089,981 | 5/1978 | Richardson . |
| 4,103,037 | 7/1978 | Bodor et al. . |
| 4,177,293 | 12/1979 | Formain et al. . |
| 4,217,372 | 8/1980 | Ebskamp . |
| 4,279,658 | 7/1981 | Harvey et al. . |
| 4,389,426 | 6/1983 | Reissmann et al. . |
| 4,390,561 | 6/1983 | Blair et al. . |
| 4,520,037 | 5/1985 | Gould et al. . |
| 4,555,411 | 11/1985 | Moran et al. . |
| 4,568,556 | 2/1986 | McCoy . |
| 4,571,347 | 2/1986 | Izzo et al. . |
| 4,615,892 | 10/1986 | Morehouse et al. . |
| 4,844,620 | 7/1989 | Lissant et al. . |
| 4,882,187 | 11/1989 | Izzo et al. . |
| 4,888,197 | 12/1989 | Wieske ....................................... 426/603 |
| 4,917,915 | 4/1990 | Cain ............................................. 426/603 |
| 4,954,362 | 9/1990 | Wesdorp et al. . |
| 4,990,355 | 2/1991 | Gupta ......................................... 426/603 |
| 5,053,241 | 10/1991 | Mongeau et al. . |
| 5,064,677 | 11/1991 | Cain et al. . |
| 5,096,732 | 3/1992 | Mongeau et al. . |
| 5,151,290 | 9/1992 | Norton ........................................ 426/603 |
| 5,169,668 | 12/1992 | Milio et al. . |
| 5,244,688 | 9/1993 | Norton et al. . |
| 5,302,408 | 4/1994 | Cain ............................................ 426/603 |
| 5,352,475 | 10/1994 | Tholl . |
| 5,374,445 | 12/1994 | Havenstein ................................. 426/603 |
| 5,409,727 | 4/1995 | Tholl . |
| 5,554,407 | 9/1996 | Bodor ......................................... 426/603 |
| 5,624,702 | 4/1997 | Schotel ....................................... 426/603 |

FOREIGN PATENT DOCUMENTS

| | | |
|---|---|---|
| 011 344 | 5/1980 | European Pat. Off. . |
| 011 891 | 6/1980 | European Pat. Off. . |
| 101 104 | 2/1984 | European Pat. Off. . |
| 199 397 | 10/1986 | European Pat. Off. . |
| 237 120 | 9/1987 | European Pat. Off. . |
| 276 517 | 8/1988 | European Pat. Off. . |
| 297 690 | 1/1989 | European Pat. Off. . |
| 2644326 | 9/1990 | France . |
| 2305411 | 9/1974 | Germany . |
| 1094268 | 12/1967 | United Kingdom . |
| 1327511 | 8/1973 | United Kingdom . |
| 1 450 269 | 9/1976 | United Kingdom . |
| 2 021 140 | 11/1979 | United Kingdom . |
| 2194166 | 4/1987 | United Kingdom . |

OTHER PUBLICATIONS

Bailey's Industrial Oil and Fat Products,; 3rd Edition; pp. 344–349.

Encyclopedia of Food Science and Technology, vol. 3; pp. 1643–1644.

*Primary Examiner*—Carolyn Paden
*Attorney, Agent, or Firm*—Gerard J. McGowan, Jr.

[57] ABSTRACT

A process for preparing a very low fat water-in-oil spread and a spread made by the process. The process entails a cold mixing procedure wherein an at least partially pre-gelled aqueous phase is mixed with an at least partially pre-solidified fat continuous emulsion of fat and water. Emulsions of less than 30% fat and even 20% or less fat may be prepared.

11 Claims, 3 Drawing Sheets

PROCESS FOR MAKING SPREADS

This is a Continuation application of Ser. No. 08/445,485 filed May. 22, 1995, now U.S. Pat. No. 5,554,407 which is a continuation of Ser. No. 08/335,568 filed Nov. 7, 1994, now abandoned which is a continuation of Ser. No. 08/084,752 filed Jun. 29, 1993, now abandoned which is a continuation of Ser. No. 07/822,503 filed Jan. 17, 1992 now abandoned.

BACKGROUND OF THE INVENTION

Studies have suggested the need for individuals to reduce their intake of fat, particularly saturated fat, to minimize the risk of cardiac and other diseases. Moreover, the reduction of overall calories ingested has been of interest to prevent obesity, which has been linked to diabetes, heart disease and other ailments.

In recognition of the need to reduce intake of fat and to decrease the total number of calories consumed, efforts have been undertaken to reduce substantially the amount of fat and the overall calorie count of bread spreads, including those which function to replace butter. For reasons of microbiological stability and resemblance to butter, it is desirable that such spreads be fat-continuous. However, as the amount of fat is decreased below 35%, and particularly below 30%, it becomes increasingly difficult to formulate a stable, fat-continuous spread which is acceptable to consumers. Factors related to consumer acceptance of a spread include the ease of spreading on bread and the similarity to butter of its melting characteristics, both on bread and in the mouth.

Izzo et al. U.S. Pat. No. 4,882,187 discloses a process for preparing an edible spread having a lower fat content than butter or margarine. The process includes admixing with an aqueous composition a plastic dispersion having a continuous fat phase and a discontinuous aqueous phase. The dispersed aqueous phase has a pH above 4.7 and contains proteins whereas the aqueous composition has a pH at or below 4.7, contains hydrocolloid and is substantially free of milk and soy protein. The mixture of the continuous fat phase and the aqueous composition is worked at a temperature at which the fat-continuous phase remains plastic. Izzo et al. discuss the use of either high or low shear.

The Izzo et al. spread is said to include one fat phase and two distinct aqueous phases. The need for emulsifiers is said to be reduced or eliminated. Particularly good results are said to be obtained when butter is used as the fat-continuous plastic dispersion, although it is said that common margarine may be employed. It is said that spreads having as little as 26% fat have been prepared in accordance with the Izzo et al. invention without the assistance of emulsifiers; the preferred range is 30–65% fat. Preferred products are said to be made with butter and gelatin solutions, and in discussing the temperature range of the gelatin solution it is stated that once the gelatin solution has gelled, the resulting product is grainy and has poor organoleptic qualities.

Lissant et al. U.S. Pat. No. 4,844,620 describes a process for preparing a high-internal-phase-ratio emulsion, such as a low fat spread, wherein the external and internal phases have highly disparate viscosities. Lissant et al. feed their phases into a recirculation line which includes a pump, a shearing device, an outlet for removing some of the product for packing and an inlet for recirculating part of the product. The spread of the Lissant et al. example includes emulsifiers, sodium benzoate and citric acid. It is said that the modifying component is dissolved in the external phase. Lissant et al. do not appear to indicate that their aqueous phase should be gelled.

EP 011,891 indicates that low fat spreads can be improved by including in the continuous fat phase a discontinuous aqueous phase consisting of non-gelled, liquid finely dispersed droplets having a size range from 1 to 5 microns and a second discontinuous aqueous phase consisting of coarse, gelled spherical droplets having a diameter in the range of from 10 to 20 microns. One or both of the aqueous phases may include protein, e.g., milk protein. Emusifiers may also be included.

The '891 publication states that gelling can be effected before, but preferably during, emulsification of the fatty and liquid aqueous ingredients. Also, it is indicated that emulsions can be prepared by using gelled spherical ingredients that have been obtained by emulsifying a liquid gelling agent containing aqueous phase in a fatty phase, letting the gelled spherical ingredients form in situ and by blending the emulsion obtained with another fat-continuous emulsions containing dispersed liquid aqueous phase. In Example 1, two water-in-oil emulsions are mixed in a scraped surface heat exchanger (Votator A unit) at temperatures of 17° C. and 20° C., cooled to 0° C. and packed at 17° C.

Gould et al. U.S. Pat. No. 4,520,037 discloses a fat-continuous emulsion comprising at least two distinct aqueous phases each of which comprises a microbiologically labile nutrient such as milk protein, vegetable protein, glucose, lactose or partially hydrolyzed starch. Antibacterial compounds or preservatives are concentrated in each of the two aqueous phases. The inclusion of emulsifiers is preferred.

Moran GB 1,094,268 discloses a spread for bread comprising a water-in-fat emulsion having 20 to 50% fat wherein the aqueous phase contains a thickening agent and the fat phase includes an emulsifier. One method of preparing the products comprises emulsifying the aqueous phase containing the thickening agent in the partially crystallized fat containing the emulsifier. Prior to mixing, both the aqueous phase and the fatty phase are preferably cooled to temperatures well below the upper melting point of the fat, e.g., between about 25° C. and 45° C. Alginate ester may be used as the thickening agent.

EP 199 397 discloses a process for preparing an edible fat containing product wherein a fat-containing fraction is cooled to cause crystallization of part of the fat and a fraction is mixed with the partially crystallized fraction in a mixer including a pattern of cavities. Protein, gelling and thickening agents are mentioned as possible ingredients. It is said that low fat spreads having a continuous fat phase and a dispersed aqueous phase may be obtained. The amount of crystallized fat is preferably at least 2%. Preferably one fraction comprises at least 80% fat and the other fraction is an aqueous solution or a dispersed system having a continuous aqueous phase. The aqueous phase may contain gelling agents such as gelatin and protein.

In Example 3, of the '397 document, the aqueous phase is a cream which includes milk protein and gelatin.

GB 2 021 140 discloses dairy blends intended to have improved spreadability compared to butter at refrigeration temperatures. The water content can vary from about 10% up to 45% by weight of the total composition. In Example 1, a dairy blend which appears to be approximately 65% fat by weight is prepared by softening butter to 30° C. and mixing therewith a partially gelled solution including gelatin and water. Rape seed oil is then added. In Example 3, milk is used instead of water.

Cain et al. U.S. Pat. No. 4,917,915 discloses spreads containing less than 35 wt. % fat which can be obtained by using a gel-forming aqueous phase having a viscosity of at least 20 mPa.s at 5° C. at a shear rate of 17090 sec$^{-1}$.

SUMMARY OF THE INVENTION

It has now been discovered that stable, fat-continuous emulsions having fat levels of less than 30%, especially less than 25%, and even less than 20% can be prepared by a cold mixing procedure whereby an aqueous composition including one or more gelling and/or thickening agents is mixed with an at least partially pre-solidified fat-continuous emulsion of fat and water. The gelling and or thickening agents are present in the aqueous composition at a concentration at or above the critical concentration required for gelling of the agent or combination of agents. Preferably, the aqueous phase is at least partially pre-gelled. At no point after mixing does the temperature exceed the melting point of the fat-continuous phase or the gel setting temperature of the aqueous phase. Preferably fats of vegetable origin are employed. Desirably, at no point after mixing is a water-continuous product formed. The emulsions are advantageously used as bread spreads, particularly plasticized bread spreads.

Preferably, the aqueous composition includes less than 50% fat, especially less than 20%; most preferably the aqueous composition is substantially fat-free. If there is any fat present in the aqueous composition, it is dispersed so that the aqueous composition is water-continuous. Desirable gelling characteristics may be achieved by gelling the aqueous composition with gelatin alone or with mixtures of gelatin and rice starch and/or waxy maize starch.

In accordance with the invention, just prior to mixing with the aqueous phase, the fat-continuous emulsion is at least partially crystallized. Preferably the temperature and composition of the fat-continuous emulsion just prior to mixing with the aqueous composition is such that at least 1% by weight is crystallized, particularly at least 3% is crystallized, and ideally from 3 to 15% is crystallized. the fat-continuous emulsion is preferably semi-solid prior to mixing.

In accordance with a second, optional, aspect of the invention, both the aqueous composition and the aqueous phase of the fat-continuous emulsion may include milk protein and/or soy protein, preferably milk protein.

The mixing of the aqueous composition and the fat-continuous emulsion can occur under either low or high shear. It has been found that particularly favorable results are obtained when there is substantial back-mixing. In an ideally back mixed mixer, the mixing is uniform so that the emulsion microstructure is the same throughout the interior of the mixer starting from a point just beyond the inlet to the mixer. As a result of the back-mixing, gelled aqueous phase is dispersed almost instantly into the fat continuous emulsion already present in the mixer. At no point in the mixer should there be a region of water-continuous emulsion. Substantial back-mixing is obtained by recirculating product to the mixer or by using a mixer specially designed to produce back-mixing internally. Since cavity transfer mixers do not per se impart back-mixing, they may not be used to mix the aqueous phase with the fat-continuous emulsion, at least absent recirculation means.

In accordance with a further preferred aspect of the invention, the present low fat emulsions have a particular structure in that the aqueous phase is formed of two distinct types of droplets, a generally spherically shaped droplet and a non-spherically shaped droplet having the critical gelling concentration of the gelling and/or thickening agents or combination thereof. The non-spherical droplet may be of a polygonal or other non-spherical shape. Generally the shape of the non-spherical droplets is irregular and it includes non-curved portions.

The emulsions of the invention are preferably plasticized.

For a more complete understanding of the above and other features and advantages of the invention, reference should be made to the following detailed description of preferred embodiments and to the accompanying drawings.

DETAILED DESCRIPTION OF THE INVENTION

The emulsions/spreads of the invention are made by a process wherein a fat-continuous emulsion and an aqueous composition are combined, preferably on a continuous basis. In accordance with one aspect of the present invention, at the time that the phases are combined, the temperature of the fat-continuous emulsion is less than the complete melting point for the fat-continuous emulsion. That is, there is still crystallized fat in the fat-continuous emulsion when it is combined with the aqueous phase.

The maximum temperature for the fat-continuous emulsion prior to combination with the aqueous composition will vary, depending on the composition of the phase. The temperature of the combined aqueous composition and fat emulsion should likewise be limited from the time that they are combined through the completion of the packing of the product so that the temperature does not exceed that which is necessary to preserve at least some crystallized fat.

In contrast with the Lissant, et al. patent mentioned above, the present invention involves mixing of fat-continuous and aqueous compositions having viscosities which are similar. In general, the ratio of viscosities, at the shear rate applied in the mixer, of the aqueous composition to the fat-continuous emulsion which is mixed therewith should be from 0.2 to 5.0, preferably 0.5 to 2.

The starting fat-continuous emulsion comprises fat and water. Generally, the fat-continuous emulsion prior to mixing with the aqueous composition will contain from 0 to 60%, preferably from 15 to 35%, of an aqueous phase dispersed therein. It is also preferred that the fat blend have an N-value at 10° C. of at least 6% and no greater than 55%. The N-value is measured by the nuclear magnetic relaxation technique and is a direct measure of the level of solid fat content at a given temperature. An appropriate procedure is described in Fette, Seifen, Anstrichmittel 80(5), 180–186 (1978).

Optional ingredients in the fat-continuous emulsion which is combined with the aqueous composition include emulsifiers, salt (particularly sodium chloride), preservatives, flavors, protein, vitamins, especially fat soluble vitamins such as Vitamin A, antioxidants, antimicrobials, and preservatives, including citric and other acids. The emulsifiers can include mono- and diglycerides, partial polyglycerol esters, lecithin and polyoxyethylene sorbitan monoesters such as TWEEN 60 and TWEEN 80. One advantageous emulsifier is a polyglycerol polyricinoleate sold under the name Admul Wol available from Quest International, Naarden, the Netherlands.

Emulsifier may be included at from 0.05 to 2% by weight, typically not more than 1% by weight.

It is preferred that the fat used be triglyceride fat derived from vegetable sources including soybean, corn, sunflower, palm, palmkernal, rapeseed, coconut, safflower, cottonseed, peanut and olive oils. Other digestible fat sources which may be used are fish oil, milk fat, skim milk fat, butterfat, lard and tallow. The oil will be hardened by hydrogenation if that is necessary to achieve the desired melting characteristics. Also, fractionation and interesterification may be used to obtain fats of the desired melting range.

Non-digestible fats may also be used as the fat source. Among the non-digestible fats are included polyol polyesters of C8 to C22 fatty acids such as sucrose polyester, sucrose polyethers, silicone oils/siloxanes, polycarboxylic acid esters, branched chain fatty acid triglycerides, neopentyl alcohol esters, dicarboxylic acid esters, jojoba oil and triglycerol ethers. Non-digestible fats may be used as from 0 to 100% of the fat, especially from 10 to 90%, and most especially from 25 to 75%.

Non-lipid fat replacers may also be used, to provide body to the product. These include protein-based fat replacers such as those described in Singer et al. U.S. Pat. No. 4,961,953 and cellulosic bulking agents such as microcrystalline cellulose and carboxymethyl cellulose.

Coloring agents, such as beta carotene, paprika, turmeric and annatto may be employed.

The proteins used in the present invention can conveniently be in the form of milk protein from whole, skim or other low fat milk and may comprise whey proteins (with or without lactose), acid casein and caseinates. Vegetable protein, such as soy protein, peanut protein, cottonseed protein, and the like may also be used.

In addition to sodium chloride, flavor enhancers which may be employed include lactones, lipolyzed butter oils and starter distillates, diacetyl, 2-octanone, butyric acid, hexanoic acid, and other fatty acids, esters of butyric acid, delta-hydroxy acids and their glycerol esters and mixtures thereof.

Preservatives, such as benzoic acid, sorbic acid, phosphoric acid, lactic acid, acetic acid, hydrochloric acid and the soluble salts thereof may be used. Likewise, the fat-continuous emulsion may include antimicrobials such as potassium sorbate, sodium sorbate, potassium benzoate, sodium benzoate and phosphoric acid.

Antioxidants may include normal propyl gallate, the tocopherols, including Vitamin E, butylated hydroxyanisole (BHA), butylated hydroxytoluene (BHT), nordihydroguaiaretic acid (NDGA), tertiary-butylhydroquinon (TBQH) and citric acid.

Figure 1:
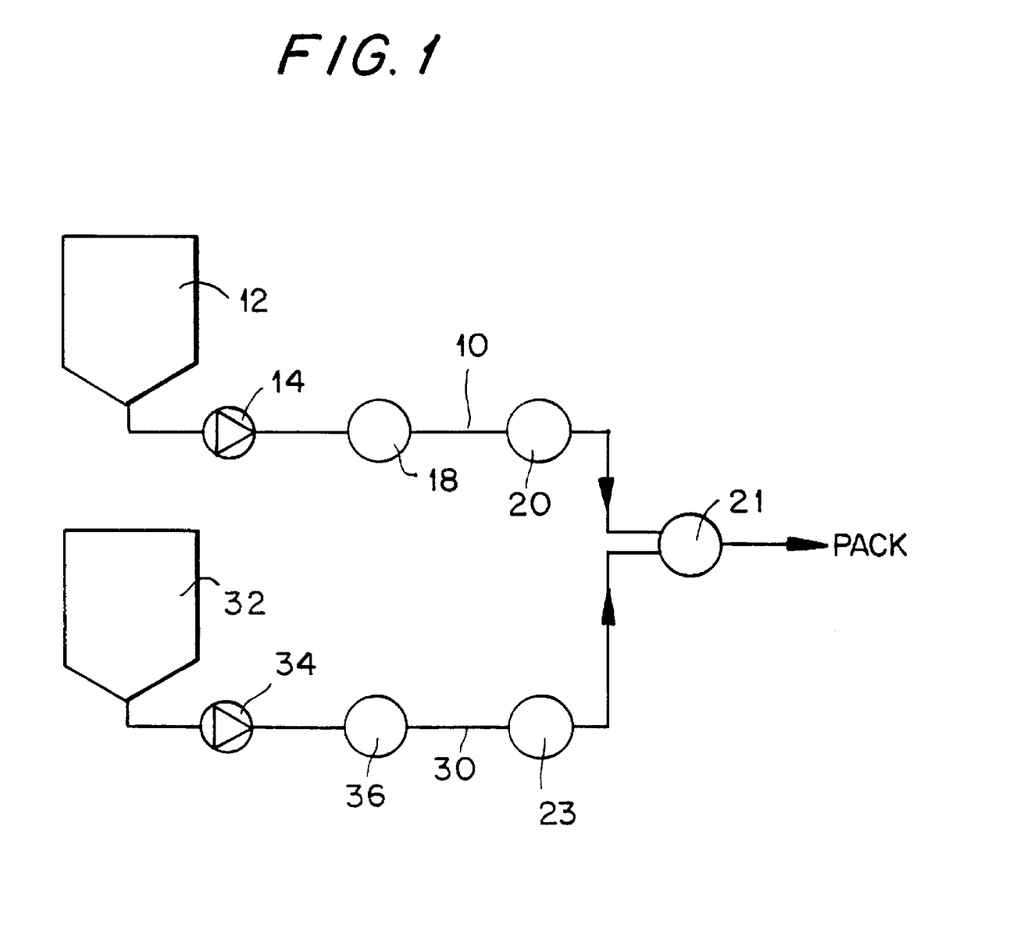
FIG. 1 is a schematic diagram of the process according to the invention.

As seen in FIG. 1, fat-continuous emulsion line 10 includes feed tank 12, which stores the ingredients used in preparing the fat-continuous emulsion which is mixed with the aqueous composition, i.e., the starting fat-continuous emulsion. Fat-continuous emulsion pump 14 pumps the fat-continuous emulsion into a Votator(R) A-unit 18. An A-unit is a scraped surface heat exchanger. A-unit 18 lowers the temperature of the fat-continuous emulsion.

From unit 18, the fat emulsion is pumped to Votator(R) C-unit 20, where it is given residence time to crystallize and is mildly worked at from 50 to 400 rpm. After the working in the C-unit, the continuous-fat emulsion is pumped into mixer 21.

The aqueous composition comprises water and, optionally other ingredients. A preferred ingredient is one or more gelling agents such as gelatin. It is advantageous that the aqueous composition is gelled, which in some respects compensates for the lower amounts of fat in the product. It is particularly advantageous for the aqueous composition to be pre-gelled, i.e., gelled prior to combining the aqueous composition with the fat-continuous emulsion. Other suitable gelling agents include waxy maize starch such as Ultra-Tex 2 available from the National Starch and Chemcial Co., Bridgewater, N.J. or a rice starch such as Remyrise AC. A particularly effective combination of gelling agents has proved to be gelatin and waxy maize or rice starch. Other gelling agents include carrageenan, and gelling hydrolyzed starch derivatives such as gelling maltodextrin, for example, Paselli maltodextrin SA2(R).

Hydrocolloids which are thickening rather than gelling agents may also be used. Hydrocolloids are described in Zeitschrift fur Lebensmittletechnologie und Verfahrenstechnk 32 (1981) 6,pp. 253–256. Hydrocolloids in addition to those mentioned above include polysaccharides such as native and modified starches, cellulose derivatives, pectins, galleon, xanthan gum, agar, Danish agar, furcelleran, gum arabic, guar gum, locust bean gum, algin, and alginates. Hydrocolloids will generally used at levels of from 0.2 to 6%, based on total product. It will be appreciated that the gelling and thickening agents may be used in various combinations.

Additional ingredients which may be present in the aqueous composition include salt (particularly sodium chloride), preservatives, such as potassium sorbate, lactic and other acid, proteins, coloring agents, flavors, antimicrobials, antioxidants and vitamins, particularly water-soluble vitamins such as the B vitamins.

Proteins, water-soluble coloring agents, flavors, preservatives and antimicrobials and antioxidants useful in the aqueous composition are the same as those discussed above in connection with the fat-continuous emulsion.

Aqueous composition line 30 includes a run tank 32 for holding the aqueous composition and an aqueous composition pump 34. The aqueous phase is cooled to a temperature below its critical gel-forming temperature. A scraped surface heat exchanger (A-unit) 36 or any other suitable cooling device can be used for this purpose. The cooled aqueous phase is then given residence time to allow the thickening agents to form an at least partially gelled aqueous phase. A slowly turning pin-mixer (C-unit) 23 may be used. The amount of residence time required will depend both on the concentration of the thickening agents present and the temperature used. It is important for the aqueous phase to be adequately gelled; otherwise, it will not be possible to maintain a fat-continuous emulsion at the low fat levels contemplated herein.

There are two basic requirements for the mixer: a) there must be adequate shear to disperse the gelled aqueous phase into the semi-solid fat phase and b) there must be a high degree of back-mixing so that the gelled aqueous phase is dispersed almost instantly into the fat-continuous emulsion already present in the mixer. At no point in the mixer should there be a region of water-continuous emulsion.

Figure 2:
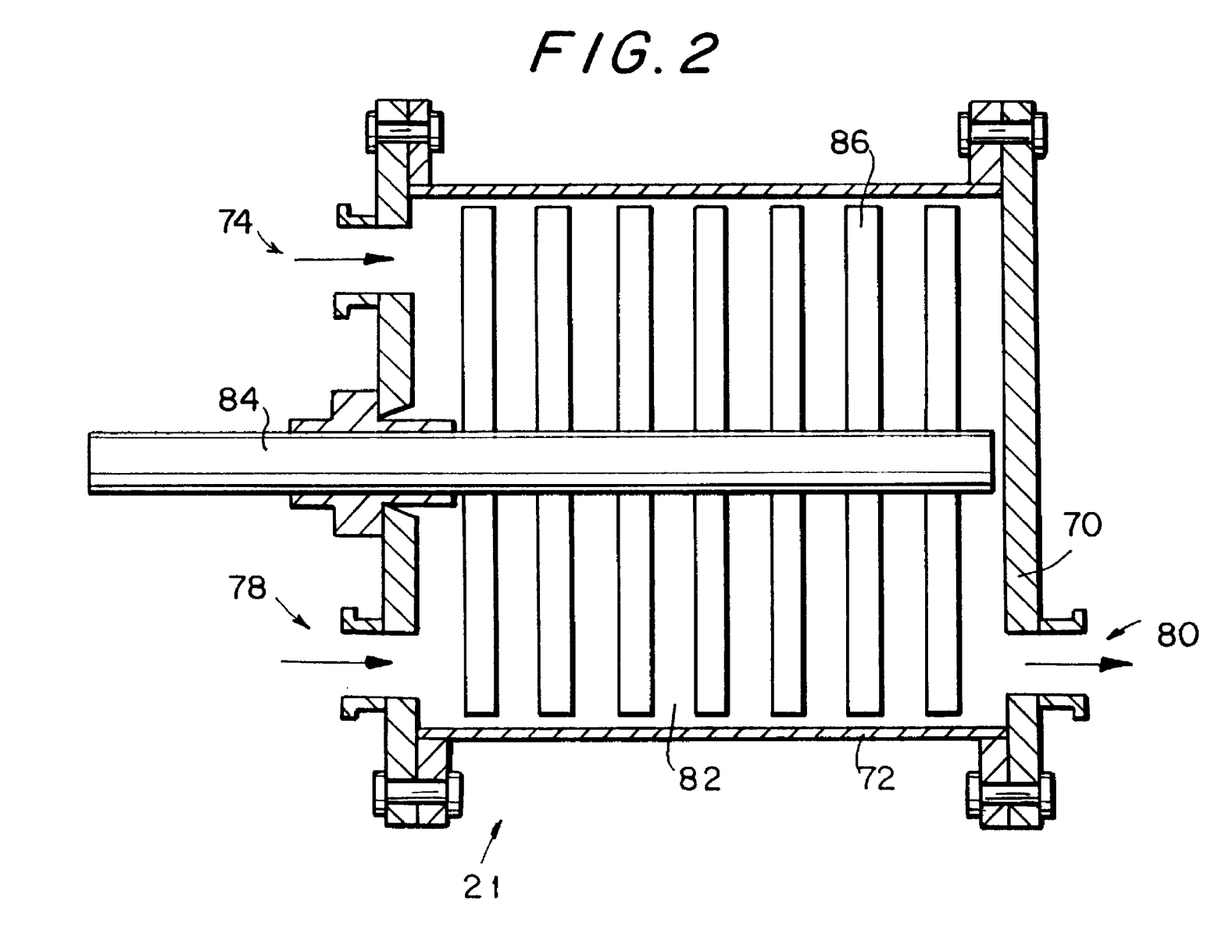
FIG. 2 is a cross section of a mixer which can be used in the process of the invention.

The back-mixing can be internal or external to the mixer depending on the mixer design. FIG. 2 illustrates a mixer with internal back-mixing. The disclosed mixer is a variation on a standard pin-mixer, except that it has a ratio of length to diameter (L/D) of about 1 instead of the more common 4–6 found in regular pin-mixers. This geometry combined with high shaft rotational speeds (>1000 rpm) results in a mixer that is highly back-mixed. Other mixers having more of a plug flow effect, such as regular pin-mixers (L/D of 4–6) and static mixers, have been used successfully when back-mixing is provided externally with a recirculation loop over the mixer.

One method for quantifying the amount of back-mixing required involves consideration of the performance of several different mixers with regard to their dispersion numbers ($D_L/uL$). The dispersion number is a widely recognized chemical engineering term used to describe residence time profiles in vessels with varying degrees of plug-flow and back-mixing (see Chemical Reaction Engineering, 2nd Edition, by O. Levenspiel. Copyright 1972). Ideal back-mixed mixers have a dispersion number of infinity whereas ideal plug-flow mixers have a dispersion number of zero. In actuality, all mixers lie somewhere in between these ideal values. Mixers (either internally or externally back-mixed) with dispersion numbers greater than 0.06 are preferred, with values greater than 0.1 especially preferred and values of 0.2 or more particularly preferred.

Mixer 21, best seen in FIG. 2, is specially designed to maximize back-mixing. Mixer 44 is has an L/D ratio of 1. Mixer 21 includes a casing 70, fat emulsion inlet 78, aqueous composition inlet 79, product exit 80, mixing chamber 82, rotor 84 and mixing pins 86. Exemplary dimensions for mixer 21 would be as follows: volume 2.4 L, length 6 inches, diameter 5.8 inches, pin diameter 0.375 inches and shaft diameter 1.5 inches.

Post-cooling or post-working devices such as scraped surface heat exchangers or pin-type mixers may be used to refine further the texture of the product.

The fat content of the overall product is preferably less than 30%, especially less than 25% and most preferably less than 20%. It is expected that the emulsions contain at least 2% fat, more usually at least 10% fat. Generally, the product will contain at least 15% fat.

Figure 3:
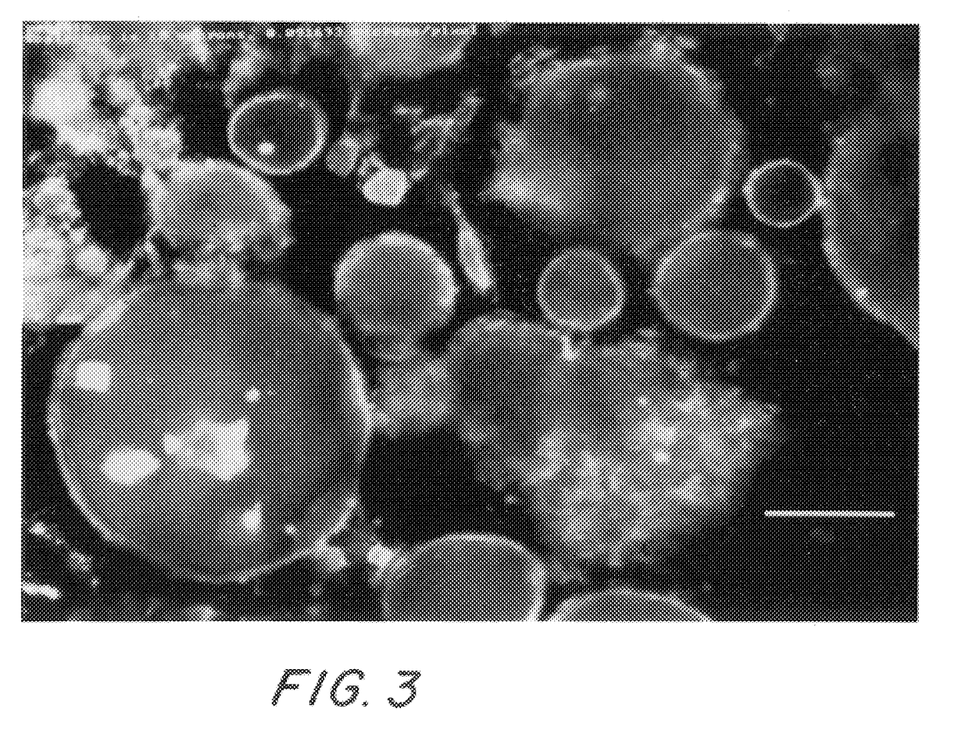
FIG. 3 is a photograph of the spherical and non-spherical particles according to the invention.

As can be seen in the photograph of FIG. 3, which has a 10 micron scale bar, the aqueous phase includes two distinct types of droplets, a generally spherically shaped droplet and a non-spherically shaped droplet having the critical gelling concentration of the gelling and/or thickening agents or combination thereof. The non-spherical droplet may be of a polygonal or other non-spherical shape. Generally the shape of the non-spherical droplets is irregular and it includes non-curved portions.

Although we do not wish to be bound by theory, we presume that the spherically shaped droplets consist primarily of the non-gelling aqueous phase and the non-spherical droplets consist primarily of the gelled aqueous phase.

EXAMPLE 1

A very low fat spread containing 23% continuous fat phase and 77% dispersed aqueous phase was prepared as follows:

An aqueous phase solution was prepared containing the following ingredients:

|  | Wt. % |
|---|---|
| Water | 93.47 |
| Gelatin (250 Bloom) | 3.25 |
| Ultra-Tex 2 | 1.5 |
| Whey Powder | 0.5 |
| Salt | 1.0 |
| Potassium Sorbate | 0.162 |
| Lactic Acid | 0.115 |
|  | 100 |

Aqueous phase pH 4.8

The solution was prepared by heating the water up to 85° C. and then gradually adding the dry ingredients with good agitation. After mixing for approximately 5 minutes, the solution was cooled to 55° C. and the lactic acid was added to obtain a pH of approximately 4.7–4.8. The solution was now ready for use.

A fat continuous emulsion was prepared separately with the following composition:

|  |  |
|---|---|
| Lecithin | 0.22 |
| Distilled Sat. Monoglycerides (IV = 4) | 0.25 |
| Soybean Oil | 42.9 |
| Hydrogenated Soybean | 28.6 |
| Oil (MP = 40.5° C.) | 72 |
| Water | 25.68 |
| Citric Acid | 0.02 |
| Potassium Sorbate | 0.05 |
| Whey Powder | 1.25 |
| Salt | 1.0 |
|  | 28 |

Fat Continuous Phase pH: 5.0

This fat blend has the following N-values: N10=28.9, N20=15.1, N30=3.8.

The fat continuous phase was prepared by heating the oils up to approximately 65° C. and adding the lecithin and already melted, distilled, saturated monoglycerides under moderate agitation. The second, non-gelling aqueous phase was prepared in a separate vessel by heating the water to 85° C. (for pasteurization) and then adding the dry ingredients and stirring until dissolved. This aqueous phase was then added to the already prepared fat along with small amounts of color and flavor. The entire emulsion was then cooled to 55° C. and was ready for use.

The aqueous phase and the fat continuous phase were then processed as follows:

The aqueous phase was pumped through an A-unit where it was rapidly chilled to 15° C., a temperature well below the critical gelling temperature of this solution. The aqueous phase was then passed through a C-unit rotating at approximately 100 rpm to prevent channelling where it was given residence time of about 3 minutes in which it became thick and partially gelled. From there it was diverted into a waste tank until ready for use.

Simultaneously, the fat continuous phase was started by pumping the fat continuous emulsion through an A-unit where it was rapidly cooled to 14° C. (well below the alpha-point for this fat blend) and then it was passed through a C-unit rotating at 300 rpm. Here the fat temperature increased from 14° to 22° C. The fat contains approximately 12.8% solid fat at this point. The fat continuous phase was then diverted into a waste tank until ready for mixing.

The flow rates of the two streams were adjusted to give a product of the desired fat content (23%). In this case the ratio was 32% fat continuous stream/68% aqueous phase stream.

When all was ready, the fat continuous phase was fed into a highly back-mixed mixer such as the one described above. Gentle mixing (about 300 rpm) was begun in the mixer. When the mixer had completely filled with fat continuous phase, the partially gelled aqueous phase was then also fed into the mixer. At this point the shear was rapidly increased (1400 rpm) so that the fat continuous emulsion was maintained and the gelled aqueous phase entering the mixer was rapidly dispersed into the fat continuous emulsion. The temperature in the mixer increased to 26° C. At this temperature, the fat present contained approximately 8.3% solid fat. From the mixer, the product passed into a C-unit where the texture was adjusted by gentle shear and then the product was packed in plastic tubs. Initially after start-up, the product was high in fat and was discarded, but once the process had achieved steady-state, the product could be packed as desired.

The product obtained from this process had the following composition:

|  | Wt. % |
|---|---|
| Lecithin | 0.07 |
| Distilled Sat. Monoglycerides | 0.08 |
| Soybean Oil | 13.7 |
| Hydrogenated Soybean | 9.15 |
| Oil (MP = 40.5° C.) | 23 |
| Water | 71.8 |
| Gelatin | 2.2 |
| Ultra-Tex 2 | 1.0 |
| Whey Powder | 0.74 |
| Salt | 1.0 |
| Potassium Sorbate | 0.13 |
| Lactic Acid | 0.08 |
| Citric Acid | 0.006 |
|  | 77.0 |

Serum pH 4.87

After one week, products from this experiment were measured for hardness (C-values by penetrometer) and conductivity at both 5° and 20° C. The results were as follows:

C-value @ 5° C. (gm/cm$^2$): 564
  20° C.: 132
Conductivity @ 5° C. (uS): 7.8
  20° C.: 0.3

These products were judged to have oral melt and appearance properties comparable to commercially available gelatin containing spreads containing 40% fat.

Spreads with fat contents as high as 27% were also produced in this experiment by simply changing the ratio of the two phases and maintaining the same process conditions. The final product compositions can be obtained using the starting formulas of the two phases and the ratio in which they were mixed. With this aqueous composition, stable products below 23% were not obtained.

EXAMPLE 2

The experiment in Example 1 was repeated with the same fat continuous phase. However the following aqueous phase was used to produce a product containing an 18.5 wt. % continuous fat phase product:

|  | Wt. % |
|---|---|
| Water | 91.97 |
| Gelatin (250 Bloom) | 3.25 |
| Ultra-Tex 2 | 3.0 |
| Whey Powder | 0.5 |
| Salt | 1.0 |
| Potassium Sorbate | 0.162 |
| Lactic Acid | 0.115 |
|  | 100 |

Aqueous phase pH 4.83

Both the aqueous and the fat phase were prepared, processed and mixed together in the same way as described in Example 1. However, the ratio between the two phases was adjusted (by changing the flow rates of the two streams) to 26% fat continuous phase and 74% partially gelled aqueous phase to give a product with the appropriate fat content given above. After treatment in the mixer, in this experiment the product was passed through a post-cooling A-unit where it was cooled to 22° C. and then into a post-working unit where the temperature increased to 24° C. before packing.

The final product from this experiment had the following composition:

|  | Wt. % |
|---|---|
| Lecithin | 0.056 |
| Distilled Sat. Monoglycerides | 0.064 |
| Soybean Oil | 11.0 |
| Hydrogenated Soybean | 7.35 |
| Oil (MP = 40.5° C.) | 18.5 |
| Water | 74.9 |
| Gelatin | 2.41 |
| Ultra-Tex 2 | 2.22 |
| Whey Powder | 0.69 |
| Salt | 1.0 |
| Potassium Sorbate | 0.13 |
| Lactic Acid | 0.085 |
| Citric Acid | 0.005 |
|  | 81.5 |

Serum pH 4.91

These products had conductivities of 8.4 and 1.25 uS at 5 and 20° C., respectively. Although these products were judged to be substantially coarser and thicker in the mouth than the products produced in Example 1, they were still of reasonable quality. This was the minimum stable fat level for this experiment.

EXAMPLE 3

The experiment in Example 2 was repeated with the same aqueous phase, however, the following fat continuous formula was used to produce a 20 wt. % continuous fat phase product:

|  | Wt. % |
|---|---|
| Lecithin | 0.22 |
| Distilled Sat. Monoglycerides (IV = 4) | 0.25 |
| Soybean Oil | 48.7 |
| Hydrogenated Soybean | 22.8 |
| Oil (MP = 40.5° C.) | 72 |
| Water | 25.68 |
| Citric Acid | 0.02 |
| Potassium Sorbate | 0.05 |
| Whey Powder | 1.25 |
| Salt | 1.0 |
|  | 28 |

Fat Continuous Phase pH: 5.0

This (softer) fat blend has N-values of N10=20.0, N20=11.0, N30=2.05 and N35=0.45.

The aqueous phase was prepared and processed as in Examples 1 and 2 to give a thick partially gelled solution. The fat continuous phase was prepared as in Example 1 and pumped into an A-unit where it was rapidly cooled to 12° C. (well below the alpha point). The fat continuous emulsion was then passed into a C-unit where the temperature increased to 20° C. At this point, the fat contains approximately 11% solid fat. The two phases were mixed in the mixer at the same rpm (1400) as used in Examples 1 and 2 and at a ratio of 27.8% fat continuous phase and 72.2% partially gelled aqueous phase. The mixer temperature was 24° C. due to the lower fat continuous phase temperature. The fat contains approximately 7.4% solid fat at this mixing temperature. After the mixing step, the product was post-cooled and worked as in Example 2 before being packed.

The formulation of the finished 20% fat product was:

|  | Wt. % |
|---|---|
| Lecithin | 0.061 |
| Distilled Sat. Monoglycerides | 0.07 |
| Soybean Oil | 13.5 |
| Hydrogenated Soybean | 6.34 |
| Oil (MP = 40.5° C.) | 20.0 |
| Water | 73.6 |
| Gelatin | 2.34 |
| Ultra-Tex 2 | 2.17 |
| Whey Powder | 0.71 |
| Salt | 1.0 |
| Potassium Sorbate | 0.13 |
| Lactic Acid | 0.083 |
| Citric Acid | 0.006 |
|  | 80.0 |

Serum pH 4.90

After one week, products from this experiment were measured for hardness (C-values by penetrometer) and conductivity at both 5° and 20° C. The results were as follows:

C-value @ 5° C. (g/cm$^2$): 316
20° C.: 75
Conductivity @ 5° C. (uS): 0.75
20° C.: 0.067

These products were found to be slightly softer and more spreadable than those produced with the harder fat blends in Examples 1 and 2. Overall, these samples were found to be of good quality.

EXAMPLE 4

The experiment in Example 3 was repeated; however, a static mixer with a recirculation loop was substituted for the internally back-mixed mixer. A Waukesha lobe pump was used to pump the product around the recirculation loop. The formulations and processing conditions for the aqueous phase and the fat continuous phase were the same. The ratio between the two phases was also maintained so that a 20 wt % continuous fat phase product would be obtained. The static mixer had 14 elements each 0.875" in diameter and 1.25" long. The mixer was also jacketed so that water of controlled temperature could be used to heat or cool the product in the static mixer.

When both of the phases were at the appropriate conditions, the static mixer and the recirculation loop were filled with fat continuous phase. The Waukesha recirculation pump was started and set so that the ratio between the amount of product recirculated and the amount of product entering and leaving the loop was approximately 5:1. At this point the partially gelled aqueous phase was introduced. The temperature leaving the static mixer was kept at 24.4° C. by adjusting the temperature of the jacket water to 36° C. The pressure drop across the static mixer was approximately 45 psi. Satisfactory product (with the same composition as in Example 3) was then collected at the recirculation loop outlet. When the experiment was completed, the recirculation pump was switched off to eliminate the backmixing. The product almost immediately became water continuous at this point.

EXAMPLE 5

The experiment in Example 4 was repeated using the same partially gelled aqueous phase and fat continuous aqueous phase formulations and processing conditions. The phase ratio was kept the same so that a 20 wt. % fat product was formed and the same static mixer/recirculation loop combination was used to mix the two phases together. However, in this experiment, once a stable product was obtained at the static mixer/recirculation loop at the same mixing temperature, the temperature of the partially gelled aqueous phase was increased at the aqueous phase A-unit until the aqueous phase was clearly no longer gelled but was a liquid at the mixing point. At this time, the quality of the product began to deteriorate rapidly until the product was no longer fat continuous at the outlet of the static mixer/recirculation loop.

EXAMPLE 6

The experiment of Example 3 was repeated, except that the Ultra Tex 2 waxy maize starch was replaced by an equal amount of Remyline AP rice starch (available from S.C. Revy Industries N.V., Wijgmaal-Leuven, Belgium). The aqueous and fat continuous phases were processed and mixed together in the same ratio under the same conditions as described in Example 3. Products containing 20% fat were collected and stored at 5° C. for one week. Overall, these samples were found to be comparable to those produced in Example 3 with perhaps a slightly improved oral melt.

Unless stated otherwise, all percentages used herein are by weight unless otherwise required by the context. The terms "fat" and "oil" are used interchangeably herein, each referring to compositions including substantial amounts of triglycerides.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

What is claimed is:

1. A process for making a fat-continuous emulsion having less than 30 wt. % fat, comprising
   a) mixing an at least partially pre-gelled aqueous composition having less than 50% fat and one or more gelling or thickening agents at a concentration at or above the critical concentration required for gelling of said agent or combination of agents with an at least partially pre-solidified fat-continuous water-in-oil starting emulsion in such a way that at no time during or after the mixing step does the temperature exceed the melting point of the fat-continuous emulsion, the resulting emulsion having less than 30 wt. % fat.

2. The process according to claim 1 wherein the aqueous composition and the fat-continuous starting emulsion are mixed together by using a back-mixed mixer.

3. The process according to claim 2 wherein the mixer includes an external recirculation loop which provides back mixing.

4. The process according to claim 1 wherein at no point after the aqueous composition and fat-continuous starting emulsion are mixed is a water-continuous emulsion formed.

5. The process according to claim 1 wherein the overall fat content of the resulting fat-continuous emulsion product is less than 25%.

6. The process according to claim 5 wherein the overall fat content of the resulting fat-continuous emulsion product is less than 20%.

7. The process according to claim 1 wherein the aqueous composition is at least partially gelled prior to mixing by inclusion of said gelling or thickening agents selected from the group consisting of gelatin and mixtures of gelatin with a starch or starch derivative.

8. The process according to claim 1 wherein said aqueous composition is at least partially gelled by inclusion of gelatin and rice starch.

9. A process for making a fat-continuous emulsion having less than 30 wt. % fat, comprising mixing an aqueous composition including milk and/or soy proteins with an at least partially pre-solidified fat-continuous oil-in-water starting emulsion having proteins in its discontinuous aqueous phase in such a way that at no time during or after the mixing step does the temperature exceed the melting point of the fat phase, said fat-continuous emulsion product having less than 30 wt. % fat.

10. The process of claim 9 wherein said aqueous phase is at least partially pre-gelled prior to mixing with said fat continuous starting emulsion.

11. The process of claim 9 wherein said aqueous composition includes at least 0.01 wt. % protein.

\* \* \* \* \*